(12) United States Patent
Ohsawa

(10) Patent No.: US 8,861,142 B2
(45) Date of Patent: Oct. 14, 2014

(54) SUSPENSION BOARD WITH CIRCUIT AND PRODUCING METHOD THEREOF

(75) Inventor: Tetsuya Ohsawa, Osaka (JP)

(73) Assignee: Nitto Denko Corporation, Osaka (JP)

( * ) Notice: Subject to any disclaimer, the term of this patent is extended or adjusted under 35 U.S.C. 154(b) by 570 days.

(21) Appl. No.: 13/317,019

(22) Filed: Oct. 7, 2011

(65) Prior Publication Data

US 2012/0092836 A1 Apr. 19, 2012

Related U.S. Application Data

(60) Provisional application No. 61/344,849, filed on Oct. 22, 2010.

(30) Foreign Application Priority Data

| Oct. 13, 2010 | (JP) | ................................ 2010-230417 |
| Jul. 21, 2011 | (JP) | ................................ 2011-160163 |

(51) Int. Cl.
G11B 5/60 (2006.01)
G11B 5/48 (2006.01)

(52) U.S. Cl.
CPC ...................................... *G11B 5/486* (2013.01)
USPC .................................... 360/245.9; 360/234.5

(58) Field of Classification Search
USPC ....................... 360/245.8, 245.9, 234.5, 234.6
See application file for complete search history.

(56) References Cited

U.S. PATENT DOCUMENTS

| 7,652,890 B2 * | 1/2010 | Ohsawa et al. ................ 361/749 |
| 8,184,404 B2 * | 5/2012 | Ohsawa et al. ............. 360/245.8 |
| 8,508,888 B2 * | 8/2013 | Ohsawa ...................... 360/234.5 |
| 2003/0107843 A1 * | 6/2003 | Hanya et al. ................ 360/244.8 |
| 2007/0177302 A1 | 8/2007 | Shimazawa et al. |
| 2007/0242921 A1 | 10/2007 | Matsumoto |
| 2008/0115962 A1 * | 5/2008 | Juni et al. ........................ 174/250 |
| 2008/0130155 A1 | 6/2008 | Naniwa et al. |
| 2008/0278858 A1 * | 11/2008 | Ishii et al. ................... 360/245.9 |
| 2009/0310908 A1 * | 12/2009 | Kanagawa et al. .............. 385/14 |
| 2010/0110590 A1 * | 5/2010 | Ohsawa et al. ............. 360/234.5 |
| 2010/0118445 A1 * | 5/2010 | Ohsawa et al. ............. 360/246.2 |
| 2010/0188779 A1 * | 7/2010 | Ohsawa et al. ............. 360/246.1 |

FOREIGN PATENT DOCUMENTS

| JP | 2007-052918 | 3/2007 |
| JP | 2007-207349 | 8/2007 |
| JP | 2007-280572 | 10/2007 |
| JP | 2008-130106 | 6/2008 |
| JP | 2010-108576 | 5/2010 |

\* cited by examiner

*Primary Examiner* — Brian Miller

(74) *Attorney, Agent, or Firm* — Jean C. Edwards, Esq.; Edwards Neils PLLC

(57) ABSTRACT

A suspension board with circuit includes a metal supporting board, a first insulating layer laminated on a top surface of the metal supporting board, a second insulating layer laminated on a back surface of the metal supporting board, a first conductive pattern laminated on the surface of the first insulating layer and including a first terminal connected to the magnetic head, and a second conductive pattern laminated on the surface of the second insulating layer and including a second terminal. In a slider mounting region, the slider is mounted on the surface and an electronic element mounting space is formed. Respective end edges of the first and second insulating layers are spaced apart from and located at positions inwardly protruded in the electronic element mounting space from an end edge of the metal supporting board, and the second terminal is disposed to face the electronic element mounting space.

2 Claims, 12 Drawing Sheets

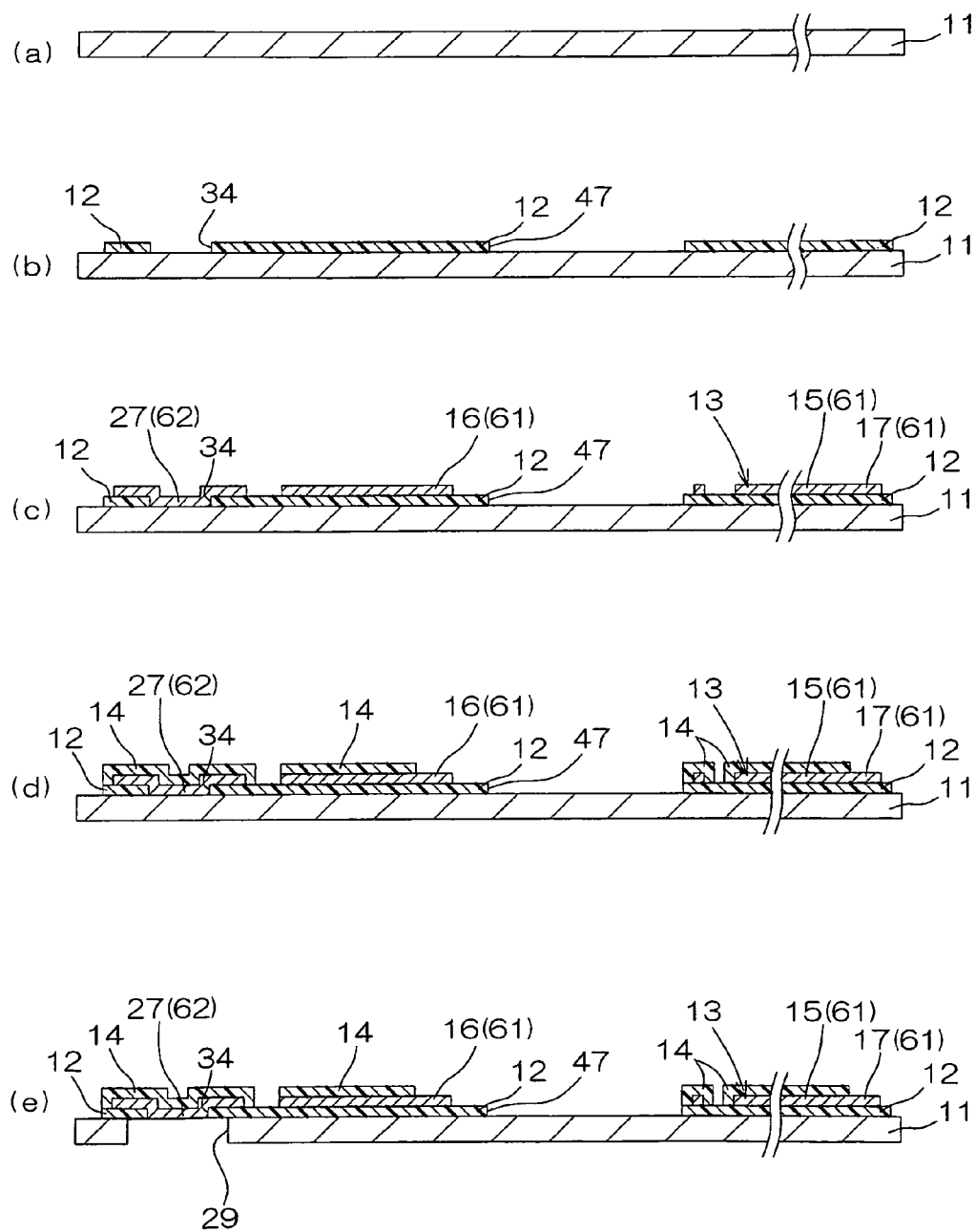

SUSPENSION BOARD WITH CIRCUIT AND PRODUCING METHOD THEREOF

CROSS-REFERENCE TO RELATED APPLICATION

The present application claims the benefit of U.S. Provisional Application No. 61/344,849, filed on Oct. 22, 2010, and also claims priority from Japanese Applications Nos. 2010-230417 filed on Oct. 13, 2010 and 2011-160163 filed on Jul. 21, 2011, the contents of which are herein incorporated by reference in their entirety.

BACKGROUND OF THE INVENTION

1. Field of the Invention

The present invention relates to a suspension board with circuit, and particularly to a suspension board with circuit used in a hard disk drive and a producing method thereof.

2. Description of the Related Art

In recent years, there has been known a suspension board with circuit on which various electronic elements are mounted. Examples of known electronic elements include a light emitting element for improving a recording density according to an optically assisted method and a testing element for testing the positional precision of a magnetic head.

For example, it has been known that, in a suspension board with circuit including a metal supporting board, a light emitting element, and a slider which are mounted on a surface of the metal supporting board, in order to employ an optically assisted method, an element-side terminal portion electrically connected to the light emitting element and a head-side connection terminal portion electrically connected to a magnetic head mounted on the slider are formed on the same surface of the metal supporting board.

However, in such a structure, both of the light emitting element and the slider are mounted on the same surface of the metal supporting board. Accordingly, the element-side terminal portion and the head-side connection terminal portion should be disposed at a high density so that it is difficult to compactize the suspension board with circuit.

In view of this, a suspension board with circuit has been proposed which includes a conductive pattern including, e.g., head-side terminals provided on the top surface of the suspension board with circuit and element-side terminals provided on the back surface of the suspension board with circuit and mounts thereon a slider on which a magnetic head electrically connected to the head-side terminals is mounted and a light emitting element electrically connected to the element-side terminals (see, e.g., Japanese Unexamined Patent No. 2010-108576).

The suspension board with circuit includes a metal supporting board, a first insulating base layer formed on the top surface of the metal supporting board, a second insulating base layer formed on the back surface of the metal supporting board, top-side power source wires formed on the top surface of the first insulating base layer, and back-side power source wires formed on the back surface of the second insulating base layer. The head-side terminals are connected to the top-side power source wires. The element-side terminals are connected to the back-side power source wires.

SUMMARY OF THE INVENTION

However, in a suspension board with circuit 1 proposed in Japanese Unexamined Patent No. 2010-108576 described above, as shown in FIG. 11, a mounting portion 3 for mounting thereon a slider 39 is formed with an insertion opening 36 through which a light emitting element 40 is inserted and, at the peripheral end edge of the insertion opening 36, the end edge of a metal supporting board 11 and the end edge of a second insulating base layer 18 are formed generally flush along a thickness direction. In addition, element-side terminals 22 are formed at an end portion of the second insulating base layer 18 so as to be proximate to the light emitting element 40 and connected to the light emitting element 40 via wires 53.

Instead, it may be required to connect the element-side terminals 22 and the light emitting element 40 using a solder in place of the wires 53.

In that case, since the end edge of the metal supporting board 11 and the end edge of the second insulating base layer 18 are formed generally flush in the thickness direction, the molten solder may flow in the thickness direction to easily go passed the second insulating base layer 18 and come in contact with the metal supporting board 11, resulting in a short circuit between the element-side terminal 22 and the metal supporting board 11 via the solder.

Also, in Japanese Unexamined Patent No. 2010-108576 described above, as shown in FIG. 12, a structure is disclosed in which the element-side terminals 22 are formed on the back surface of the first insulating base layer 12 and connected to the light emitting element 40 via solder balls 41 in place of the wires 53. Note that the second insulating base layer 18 is formed at the inner peripheral surface (front-side peripheral surface) of the insertion opening 36.

In this case, on the back surface of the first insulating base layer 12 having head-side terminals 16 on the top surface thereof, the element-side terminals 22 are formed. As a result, a molten solder may flow in the thickness direction to go passed the first insulating base layer 12 and come in contact with the head-side terminal 16, resulting in a short circuit between the element-side terminal 22 and the head-side terminal 16.

It is therefore an object of the present invention to provide a suspension board with circuit which allows prevention of a short circuit between a metal supporting board and a second terminal and a short circuit between a first terminal and the second terminal and a producing method thereof.

A suspension board with circuit of the present invention is for mounting thereon a slider on which a magnetic head is mounted and an electronic element provided in a vicinity of the magnetic head and includes a metal supporting board, a first insulating layer laminated on a top surface of the metal supporting board, a second insulating layer laminated on a back surface of the metal supporting board, a first conductive pattern laminated on the top surface side of the first insulating layer and including a first terminal electrically connected to the magnetic head, and a second conductive pattern laminated on the back surface side of the second insulating layer and including a second terminal electrically connected to the electronic element. In the suspension board with circuit, a slider mounting region for mounting thereon a slider is defined. In the slider mounting region, in the slider mounted portion, the slider is mounted on the top surface side and in the slider mounted portion, an electronic element mounting space in which the electronic element is disposed is formed so as to extend through the metal supporting board in a top-back direction extending between the top and back surfaces thereof. When projected in the top-back direction, respective end edges of the first insulating layer and the second insulating layer are spaced apart from each other in a thickness direction by a thickness of the metal supporting board and located at positions inwardly protruded in the electronic element mounting space from an end edge of the metal supporting board, and the second terminal is disposed so as to face the electronic element mounting space.

A producing method of a suspension board with circuit of the present invention is a method of producing a suspension board with circuit for mounting thereon a slider on which a magnetic head is mounted and an electronic element provided in a vicinity of the magnetic head. The producing method includes preparing a metal supporting board, forming a first insulating layer on a top surface of the metal supporting board, forming a first conductive pattern including a first terminal electrically connected to the magnetic head on the top surface side of the first insulating layer, forming a second insulating layer on a back surface of the metal supporting board, forming a second conductive pattern including a second terminal electrically connected to the electronic element on the back surface side of the second insulating layer, and etching the metal supporting board to form an electronic element mounting space in which the electronic element is disposed such that the electronic element mounting space extends through the metal supporting board in a top-back direction extending between the top and back surfaces thereof and, when projected in the top-back direction, respective end edges of the first insulating layer and the second insulating layer are spaced apart from each other in a thickness direction by a thickness of the metal supporting board and located at positions inwardly protruded in the electronic element mounting space from an end edge of the metal supporting board, while the second terminal faces the electronic element mounting space.

In the suspension board with circuit of the present invention produced by the method of producing the suspension board with circuit of the present invention, when projected in the top-back direction, the respective end edges of the first insulating layer and the second insulating layer are spaced apart from each other in the thickness direction by the thickness of the metal supporting board and located at positions inwardly protruded in the electronic element mounting space from the end edge of the metal supporting board.

That is, the end edge of the metal supporting board is relatively receded from the respective end edges of first insulating layer and the second insulating layer in a direction opposite to the protruding direction of the second insulating layer.

Therefore, when the second terminal facing the electronic element mounting space is connected to the electronic element using a solder, even if the molten solder flows toward the metal supporting board, it is possible to prevent the solder from coming in contact with the metal supporting board.

In addition, the first insulating layer is spaced apart from the second insulating layer in the thickness direction by the thickness of the metal supporting board, while protruding in the electronic element mounting space from the metal supporting board.

Therefore, it is also possible to prevent the molten solder from going passed the first insulating layer and coming in contact with the first terminal.

This can prevent the first terminal, the metal supporting board, and the second terminal from being short-circuited to each other.

DETAILED DESCRIPTION OF THE INVENTION

First Embodiment

Figure 1:
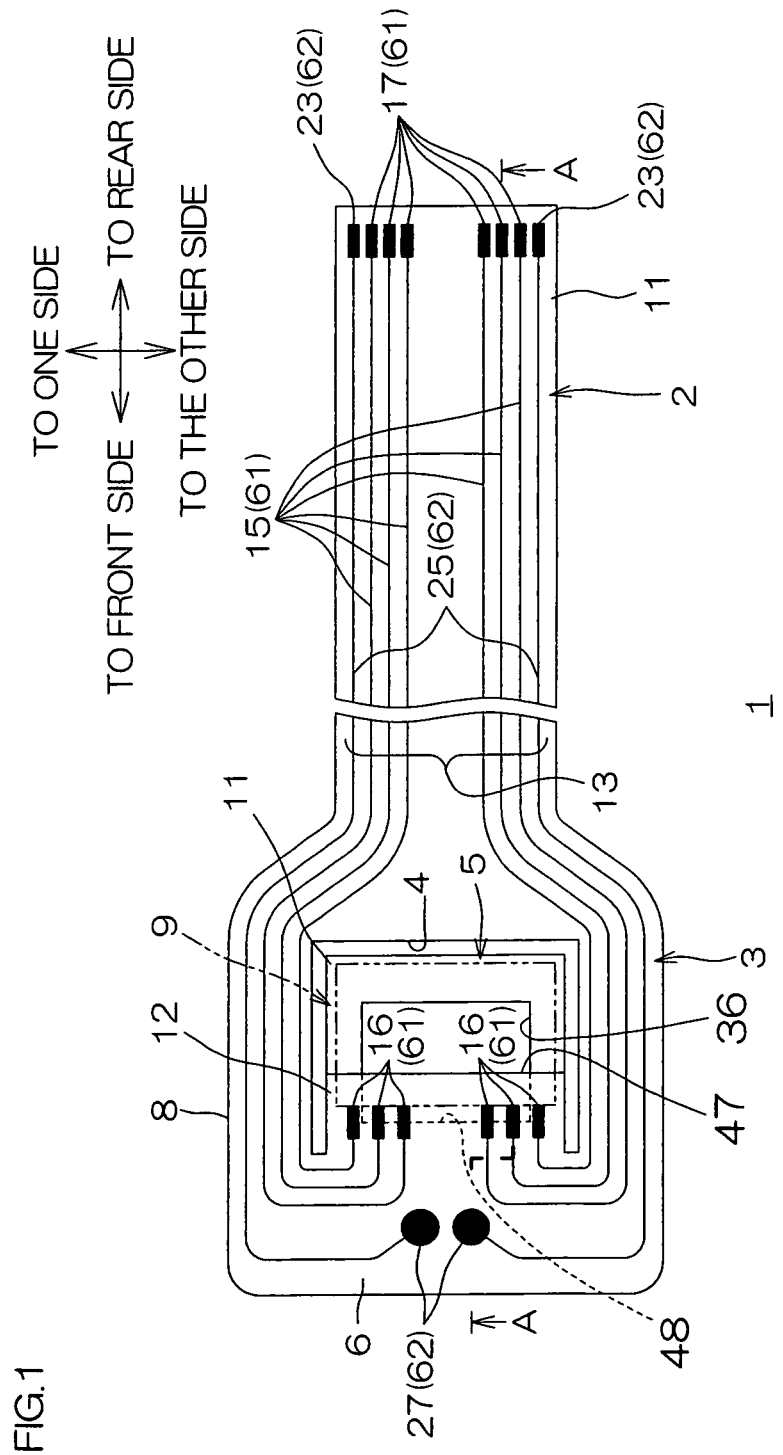
FIG. 1 is a plan view of a first embodiment of a suspension board with circuit of the present invention.
Figure 2:
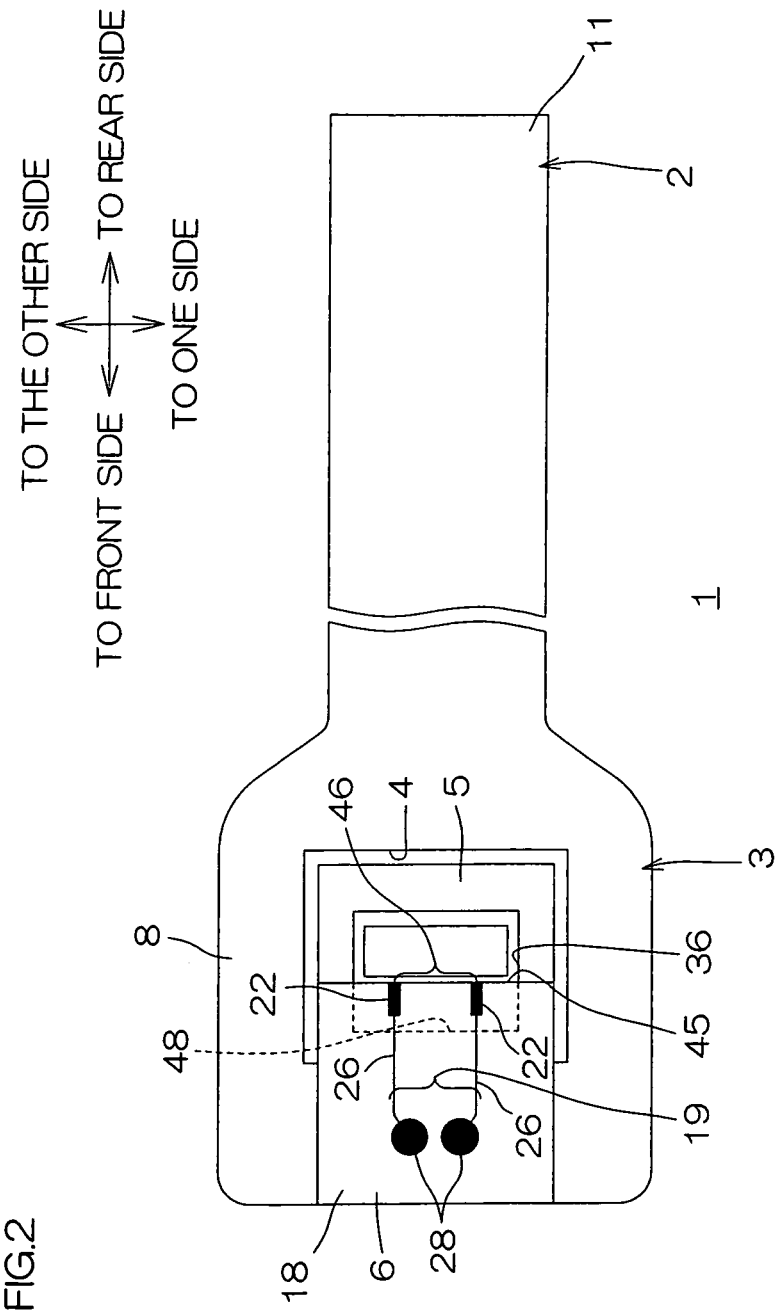
FIG. 2 is a bottom view of the suspension board with circuit shown in FIG. 1.
Figure 3:
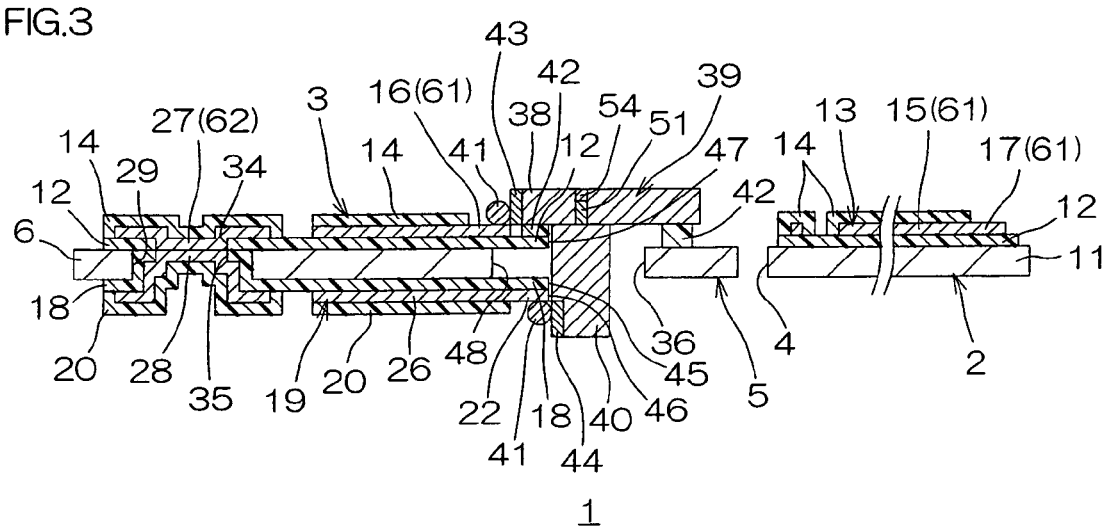
FIG. 3 is a cross-sectional view of the suspension board with circuit shown in FIG. 1 along the line A-A.

FIG. 1 is a plan view of a first embodiment of a suspension board with circuit of the present invention. FIG. 2 is a bottom view of the suspension board with circuit shown in FIG. 1. FIG. 3 is a cross-sectional view of the suspension board with circuit shown in FIG. 1 along the line A-A.

Note that, in FIG. 1, a first insulating cover layer 14 (described later) is omitted for clear illustration of relative positioning of a first conductive pattern 13 (described later). Also, in FIG. 2, a second insulating cover layer 20 (described later) is omitted for clear illustration of relative positioning of a second conductive pattern 19 (described later).

As shown in FIG. 1, a suspension board with circuit 1 is formed in a flat belt shape extending in a longitudinal direction and integrally includes a wiring portion 2 disposed on the other longitudinal side (hereinafter referred to as a rear side) and a mounting portion 3 disposed on one longitudinal side (hereinafter referred to as a front side) of the wiring portion 2.

The wiring portion 2 is formed in a generally rectangular plan view shape extending in the longitudinal direction. When the suspension board with circuit 1 is mounted on a hard disk, the wiring portion 2 is supported on a load beam (not shown) of the hard disk and connected to an external circuit board (not shown) such as a read/write board.

The mounting portion 3 is formed continuously from the front end of the wiring portion 2 into a generally rectangular plan view shape which protrudes on both outsides of the wiring portion 2 in a widthwise direction (direction perpendicular to the longitudinal direction). On the mounting portion 3, a slider 39 (described later) and a light emitting element 40 (described later) are mounted.

Also, the mounting portion 3 is formed with a generally U-shaped slit 4 which opens toward the front side when viewed in plan view. Thus, the mounting portion 3 is partitioned into a gimbal portion 5 widthwise interposed in the slit 4, outrigger portions 8 disposed on both widthwise outsides of the slit 4, and a wire turn-back portion 6 disposed on the front side of the gimbal portion 5 and the outrigger portions 8.

The gimbal portion 5 is disposed at the middle in each of a widthwise direction and a front-rear direction of the mounting portion 3 and formed in a generally rectangular plan view shape. In the gimbal portion 5, a slider mounting region 9 is defined.

The slider mounting region 9 is a region for mounting thereon the slider 39 (described later), which is defined into a generally rectangular plan view shape which is longitudinal in the widthwise direction on the rear side of the gimbal 5.

As shown in FIGS. 1 and 3, the suspension board with circuit 1 also includes a metal supporting board 11, a first insulating base layer 12 as a first insulating layer laminated on the top surface of the metal supporting board 11, the first conductive pattern 13 laminated on the top surface of the first insulating base layer 12, and the first insulating cover layer 14 laminated on the top surface of the first insulating base layer 12 so as to cover the first conductive pattern 13.

The metal supporting board 11 is formed to extend in the longitudinal direction and have the same outer shape as the outer shape of the suspension board with circuit 1 described above.

The metal supporting board 11 is formed with an insertion opening 36 as an electronic element mounting space and conduction openings 29.

The insertion opening 36 is formed in a generally rectangular plan view shape at the widthwise middle of the slider mounting region 9 so as to extend through the metal supporting board 11 in a thickness direction. The insertion opening 36 is formed to be capable of receiving the light emitting element 40 (described later).

The plurality of (two) conduction openings 29 are disposed in series and widthwise spaced-apart relation at the widthwise middle of the wire turn-back portion 6. Each of the conduction openings 29 is formed in a generally circular plan view shape extending through the metal supporting board 11 in the thickness direction.

The first insulating base layer 12 is formed so as to correspond to portions where the first conductive pattern 13 is formed.

Specifically, the first insulating base layer 12 is formed over the wiring portion 2 and the entire surfaces of the outrigger portions 8 of the mounting portion 3 so as to cover the front-side half of the insertion opening 36 and expose the rear-side half of the insertion opening 36. That is, when projected in the thickness direction at the gimbal portion 5, an end edge 47 (rear end edge) of the first insulating base layer 12 is located at a position rearwardly protruded from the front end edge of the insertion opening 36. Note that the insertion opening 36 exposed from the first insulating base layer 12 is formed to be capable of receiving the light emitting element 40 (described later).

Also, the first insulating base layer 12 covers the peripheral end edge of each of the conduction openings 29 of the metal supporting board 11 at the wire turn-back portion 6. Consequently, in the first insulating base layer 12, a plurality of (two) first base through holes 34 corresponding to the respective conduction openings 29 are formed in generally circular plan view shapes sharing the respective centers of the conduction openings 29.

The first conductive pattern 13 includes magnetic-head-side patterns 61 connected to a magnetic head 38 (described later) and electronic-element-side patterns 62 connected to the light emitting element 40 (described later).

The magnetic-head-side patterns 61 integrally include head-side terminals 16 each as a first terminal, external terminals 17, and signal wires 15 connecting the head-side terminals 16 and the external terminals 17.

The head-side terminals 16 are disposed on the gimbal portion 5 to be adjacent to the front side of the slider mounting region 9. The rear end edges of the head-side terminals 16 are disposed on the front side of the end edge 47 (rear end edge) of the first insulating base layer 12 at the gimbal portion 5. The plurality of (six) head-side terminals 16 are provided to be widthwise spaced apart from each other.

The plurality of (six) external terminals 17 are provided on the rear end portion of the wiring portion 2 to be widthwise spaced apart from each other and correspond to the head-side terminals 16. To the external terminals 17, an external circuit board (not shown) is connected.

The plurality of (six) signal wires 15 are formed in mutually spaced-apart relation so as to connect the corresponding head-side terminals 16 and the corresponding external terminals 17.

The three signal wires 15 on one widthwise side are formed along the outrigger portion 8 on one widthwise side. On the other hand, the three signal wires 15 on the other widthwise side are disposed along the outrigger portion 8 on the other widthwise side.

After reaching the both widthwise outer portions of the wire turn-back portion 6 from the front ends of the outrigger portions 8, the individual signal wires 15 extend widthwise inward at the wire turn-back portion 6, are then turned back rearward, and extend rearward from the rear end of the wire turn-back portion 6 to be connected to the front end portions of the head-side terminals 16.

The electronic-element-side patterns 62 integrally include supply-side terminals 23, top-side conducting portions 27, and top-side power source wires 25 for connecting the supply-side terminals 23 and the top-side conducting portions 27.

The supply-side terminals 23 are provided outside the widthwise outermost head-side terminals 16 in one-to-one correspondence at the rear end portion of the wiring portion 2. To the supply-side terminals 23, a power source (not shown) is connected.

The plurality of (two) top-side conducting portions 27 are formed to be filled in the respective first base through holes 34.

The top-side power source wires 25 are formed widthwise outside the widthwise outermost signal wires 15 in one-to-one correspondence to be connected to the top-side conducting portions 27 and to the supply-side terminals 23.

The first insulating cover layer 14 is formed to correspond to portions where the first conductive pattern 13 is formed. Specifically, the first insulating cover layer 14 is formed in a pattern exposing the external terminals 17 and the head-side terminals 16 and covering the signal wires 15 correspondingly to the magnetic-head-side patterns 61. Also, the first insulating cover layer 14 is formed in a pattern exposing the supply-side terminals 23 and covering the top-side power source wires 25 and the top-side conducting portions 27 correspondingly to the electronic-element-side patterns 62.

As shown in FIGS. 2 and 3, the suspension board with circuit 1 includes a second insulating base layer 18 as a second insulating layer laminated on the back surface of the metal supporting board 11, the second conductive pattern 19 laminated on the back surface of the second insulating base layer 18, and the second insulating cover layer 20 laminated on the back surface of the second insulating base layer 18 so as to cover the second conductive pattern 19.

The second insulating base layer 18 is formed to correspond to portions where the second conductive pattern 19 is formed.

Specifically, the second insulating base layer 18 is formed such that, at the generally widthwise middle (gimbal portion 5) of the mounting portion 3, the rear end edge thereof overlaps the end edge 47 (rear end edge) of the first insulating base layer when projected in the thickness direction. That is, when projected in the thickness direction at the gimbal portion 5, an end edge 45 (rear end edge) of the second insulating base layer 18 is located at a position rearwardly protruded from the front end edge of the insertion opening 36.

The second insulating baser layer 18 covers the peripheral end edge of each of the conduction openings 29 of the metal supporting board 11 at the wire turn-back portion 6. As a result, in the second insulating base layer 18, a plurality of (two) second base through holes 35 corresponding to the respective conduction openings 29 are formed in generally circular plan view shapes sharing the respective centers of the conduction openings 29.

The second conductive pattern 19 integrally includes back-side conducting portions 28, element-side terminals 22 each as a second terminal, and back-side power source wires 26 for connecting the back-side conducting portions 28 and the element-side terminals 22.

The plurality of (two) back-side conducting portions 28 are formed so as to be filled in the respective second base through holes 35.

As a result, the top-side conducting portions 27 and the back-side conducting portions 28 are brought into direct contact via the first base through holes 34 and the second base through holes 35 and electrically connected.

The plurality of (two) element-side terminals 22 are disposed on the rear end portion of the second insulating base layer 18 so as to face the insertion opening 36 and provided in widthwise mutually spaced-apart relation so as to correspond to the respective back-side conducting portions 28. The element-side terminals 22 are disposed such that, when projected in the thickness direction, end edges 46 (rear end edges) thereof are generally flush with the end edges 45 (rear end edges) of the second insulating base layer 18 at the gimbal portion 5.

The plurality of (two) back-side power source wires 26 are formed in mutually spaced-apart relation so as to connect the corresponding back-side conducting portions 28 and the corresponding element-side terminals 22.

The second insulating cover layer 20 is formed so as to correspond to the second conductive pattern 19 in the mounting portion 3. Specifically, the second insulating cover layer 20 is formed so as to expose the element-side terminals 22 and cover the back-side power source wires 26 and the back-side conducting portions 28.

On the suspension board with circuit 1, as shown in FIG. 3, the slider 39 and the light emitting element 40 as an electronic element are mounted.

The slider 39 is mounted together with the suspension board with circuit 1 on a load beam (not shown) of a hard disk drive (not shown). When the hard disk drive (not shown) is driven, the slider 39 is floated over a magnetic disk (not shown) to travel relative to the magnetic disk, while holding a minute gap therebetween.

On the slider 39, the magnetic head 38, an optical waveguide 51, and a near-field light generating member 54 are mounted.

The magnetic head 38 is mounted on the front end portion of the slider 39. When the hard disk drive (not shown) is driven, the magnetic head 38 performs reading of information recorded on the magnetic disk (not shown) therefrom or writing of information to the magnetic disk (not shown). On the front end portion of the magnetic head 38, a plurality of (six) magnetic head terminals 43 are provided so as to correspond to the head-side terminals 16 of the suspension board with circuit 1.

The optical waveguide 51 is provided so as to extend through the slider 39 in the thickness direction on the rear side of the magnetic head 38 and transmits light emitted from the light emitting element 40 to the near-field light generating member 54.

The near-field light generating member 54 is mounted on the top surface of the slider 39 so as to be continued to the upper end of the optical waveguide 51. The near-field light generating member 54 converts the incident light from the optical waveguide 51 to near-field light. When applied to the magnetic disk (not shown), the near-field light irradiates and heats a minute region of the magnetic disk (not shown). Note that the near-field light generating member 54 is formed of a metal scatterer, an opening, or the like, and a known near-field light generating device described in, e.g., Japanese Unexamined Patent No. 2007-280572, 2007-052918, 2007-207349, 2008-130106, or the like is used.

The light emitting element 40 is a light source for causing the light to be incident on the optical waveguide 51 and, e.g., converts electric energy to optical energy to emit high-energy light.

The light emitting element 40 is connected to the back surface of the slider 39 so as to be connected to the optical waveguide 51. In addition, in the back-surface-side end portion of the light emitting element 40, a plurality of (two) light emitting element terminals 44 are provided on the front end side so as to correspond to the element-side terminals 22 of the suspension board with circuit 1. The light emitting element 40 forms a light emitting unit together with the optical waveguide 51 and the near-field light generating member 54.

The light emitting unit is mounted on the slider mounting region 9 via an adhesive layer 42 provided on the peripheral edge portion of the slider mounting region 9 such that the light emitting element 40 is inserted through the insertion opening 36 and the slider 39 covers the insertion opening 36 from the top surface side.

Specifically, the back-surface-side end portion of the light emitting element 40 passes through the insertion opening 36 and is disposed on the rear side of the end edge 45 of the second insulating base layer 18 and the end edges 46 of the element-side terminals 22 to be proximate thereto and slightly spaced apart therefrom.

The front end portion of the slider 39 is bonded to the top surface of the rear end portion of the first insulating base layer 12 at the gimbal portion 5 via the adhesive layer 42. As a result, the magnetic head terminals 43 are disposed on the rear side of the head-side terminals 16 to be proximate thereto. On the other hand, the rear end portion of the slider 39 is bonded to the top surface of the rear end portion of the metal supporting board 11 at the gimbal portion 5 via the adhesive layer 42.

Figure 4:
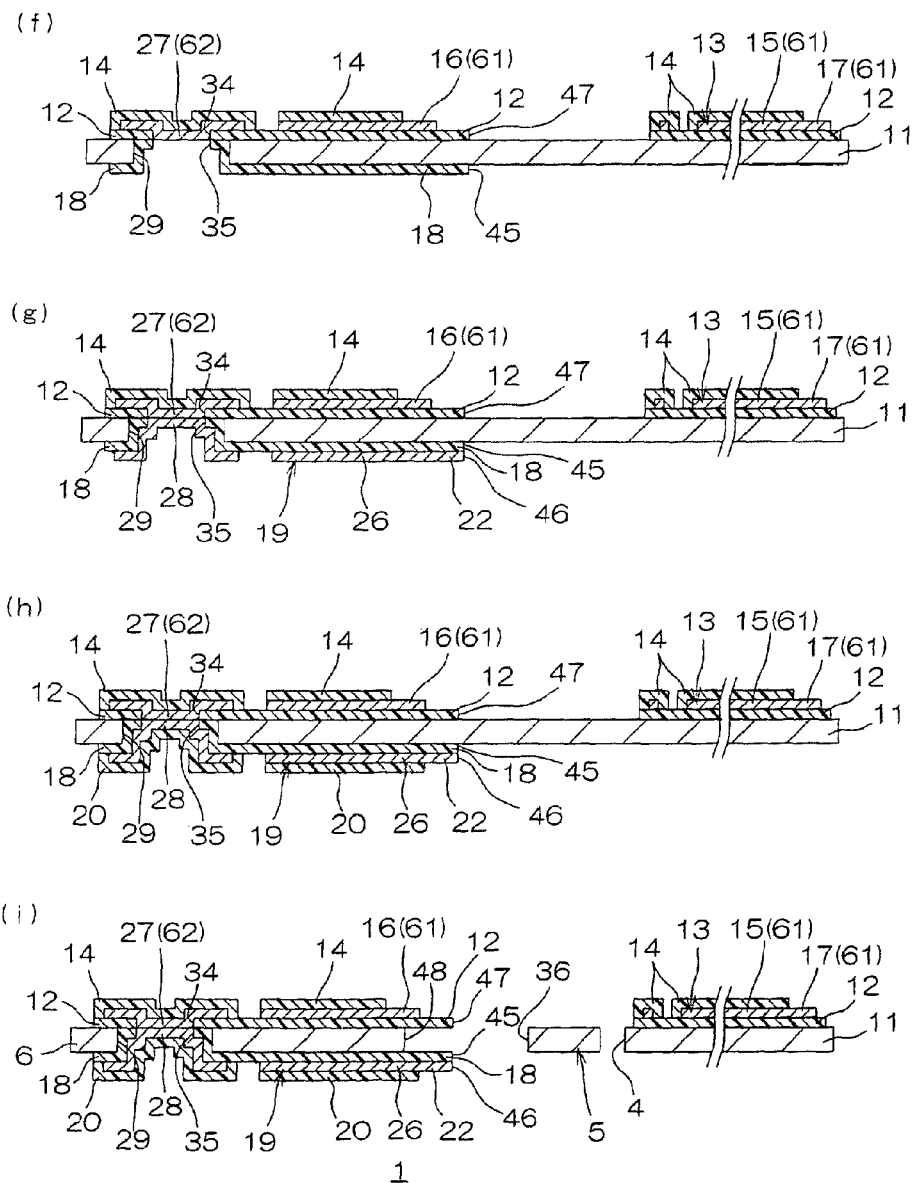
FIGS. 4(a), 4(b), 4(c), 4(d), and 4(e) are a process view for illustrating a producing method of the suspension board with circuit shown in FIG. 3, (a) showing the step of preparing a metal supporting board,
(b) showing the step of forming a first insulating base layer,
(c) showing the step of forming a first conductive pattern,
(d) showing the step of forming a first insulating cover layer, and
(e) showing the step of forming conduction openings in the metal supporting board.
FIGS. 4(f), 4(g), 4(h), and 4(i) are a process view for illustrating the producing method of the suspension board with circuit shown in FIG. 3, which is subsequent to FIGS. 4(a), (b), (c), (d), and (e), (f) showing the step of forming a second insulating base layer,
(g) showing the step of forming a second conductive pattern,
(h) showing the step of forming a second insulating cover layer, and
(i) forming a slit portion and an insertion opening in the metal supporting board.
Figure 5:
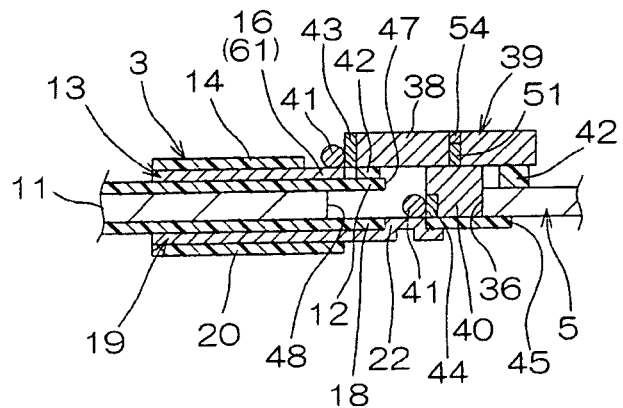
FIG. 5 shows a second embodiment of the suspension board with circuit of the present invention, which is a cross-sectional view of a slider mounting region.

FIGS. 4 and 5 are process views for illustrating a producing method of the suspension board with circuit shown in FIG. 3.

Next, a producing method of the suspension board with circuit 1 is described with reference to FIGS. 4 and 5.

First, in the method, as shown in FIG. 4(a), the metal supporting board 11 is prepared.

Examples of a material for forming the metal supporting board 11 include a metal material such as stainless steel, a 42-alloy, aluminum, a copper-beryllium alloy, or phosphor bronze. Preferably, stainless steel is used.

The thickness of the metal supporting board 11 is in a range of, e.g., 15 to 50 μm, or preferably 15 to 30 μm.

Next, as shown in FIG. 4(b), a varnish of a photosensitive insulating material is coated on the top surface of the metal supporting board 11, dried, exposed to light, developed, and cured by heating to form the first insulating base layer 12 in the foregoing pattern.

Examples of a material for forming the first insulating base layer 12 include an insulating material such as a synthetic resin such as a polyimide resin, a polyamideimide resin, an acrylic resin, a polyether nitrile resin, a polyether sulfone resin, a polyethylene terephthalate resin, a polyethylene naphthalate resin, or a polyvinyl chloride resin. Preferably, a polyimide resin is used.

The thickness of the first insulating base layer 12 is in a range of, e.g., 1 to 35 μm, or preferably 3 to 15 μm.

The diameter of each of the first base through holes 34 is in a range of, e.g., 20 to 280 μm, or preferably 40 to 200 μm.

Next, as shown in FIG. 4(c), on the top surface of the first insulating base layer 12, the first conductive pattern 13 is formed by an additive method, a subtractive method, or the like.

Examples of a material for forming the first conductive pattern 13 include a conductive material such as copper, nickel, gold, a solder, or an alloy thereof. Preferably, copper is used.

The thickness of the first conductive pattern 13 is in a range of, e.g., 3 to 50 μm, or preferably 5 to 20 μm.

The widths of the individual signal wires 15 and the individual top-side power source wires 25 are in a range of, e.g., 5 to 200 μm, or preferably 8 to 100 μm.

The spacing between the individual signal wires 15 is in a range of, e.g., 5 to 1000 μm, or preferably 8 to 100 μm. The spacings between the widthwise outermost signal wires 15 and the top-side power source wires 25 are in a range of, e.g., 5 to 1000 μm, or preferably 8 to 100 μm.

The widths of the individual head-side terminals 16, the individual external terminals 17, and the individual supply-side terminals 23 are in a range of, e.g., 15 to 1000 μm, or preferably 20 to 800 μm.

The spacing between the individual head-side terminals 16 and the spacing between the individual external terminals 17 are in a range of, e.g., 15 to 1000 μm, or preferably 20 to 800 μm. The spacings between the widthwise outermost external terminals 17 and the supply-side terminals 23 are in a range of, e.g., 15 to 1000 μm, or preferably 20 to 800 μm.

Next, as shown in FIG. 4(d), a varnish of a photosensitive insulating material is coated on the top surface of the first insulating base layer 12 so as to cover the first conductive pattern 13, dried, exposed to light, developed, and cured by heating to form the first insulating cover layer 14 in the foregoing pattern.

The first insulating cover layer 14 is formed of the same insulating material as the insulating material of the first insulating base layer 12 mentioned above. The thickness of the first insulating cover layer 14 is in a range of, e.g., 1 to 40 μm, or preferably 1 to 10 μm.

Next, as shown in FIG. 4(e), the conduction openings 29 are each formed in the metal supporting board 11.

The conduction openings 29 are each formed by, e.g., an etching method such as dry etching (e.g., plasma etching) or wet etching (e.g., chemical etching), drilling, laser processing, or the like. Preferably, the conduction openings 29 are formed by wet etching.

In this manner, from the conduction openings 29 of the metal supporting board 11, the back surface of the first insulating base layer 12 and the back surfaces of the top-side conducting portions 27 are exposed.

The inner diameter of each of the conduction openings 29 is in a range of, e.g., 50 to 300 μm, or preferably 100 to 250 μm.

Next, as shown in FIG. 4(f), a varnish of a photosensitive insulating material is coated on the back surface of the metal supporting board (including the back surface of the first insulating base layer 12 exposed from each of the conduction openings 29 and the back surfaces of the top-side conducting portions 27), dried, exposed to light, developed, and cured by heating to form the second insulating base layer 18 in the foregoing pattern.

The second insulating base layer 18 is formed of the same insulating material as the insulating material of the first insulating base layer 12 mentioned above.

The thickness of the second insulating base layer 18 is in a range of, e.g., 1 to 35 μm, or preferably 8 to 15 μm.

The diameter of each of the second base through holes 35 is in a range of, e.g., 20 to 280 μm, or preferably 40 to 200 μm.

Next, as shown in FIG. 4(g), on the back surface of the second insulating base layer 18, the second conductive pattern 19 is formed by an additive method, a subtractive method, or the like.

The second conductive pattern 19 is formed of the same conductive material as the conductive material of the first conductive pattern 13 into the foregoing pattern.

The thickness of the second conductive pattern 19 is in a range of, e.g., 3 to 50 μm, or preferably 5 to 20 μm.

The widths of the individual back-side power source wires 26 are in a range of, e.g., 5 to 200 μm, or preferably 8 to 100 μm. The spacing between the individual back-side power source wires 26 is in a range of, e.g., 15 to 1000 μm, or preferably 20 to 800 μm.

The widths of the individual element-side terminals 22 are in a range of, e.g., 15 to 1000 μm, or preferably 20 to 800 μm. The spacing between the individual element-side terminals 22 is in a range of, e.g., 5 to 1000 μm, or preferably 8 to 800 μm.

Next, as shown in FIG. 4(h), on the back surface of the second insulating base layer 18, a varnish of a photosensitive insulating material is coated so as to cover the second conductive pattern 19 on the back side, dried, exposed to light, developed, and cured by heating to form the second insulating cover layer 20 in the foregoing pattern.

The second insulating cover layer 20 is formed of the same insulating material as the insulating material of the first insulating base layer 12 mentioned above. The thickness of the second insulating cover layer 20 is in a range of, e.g., 1 to 40 μm, or preferably 1 to 10 μm.

Next, as shown in FIG. 4(i), the slit 4 and the insertion opening 36 are formed in the metal supporting board 11.

The slit 4 and the insertion opening 36 are formed by, e.g., wet etching such as chemical etching.

At this time, to form the insertion opening 36, an etching time is set relatively long to over-etch the metal supporting board 11 and thereby etch the metal supporting board 11 located between the first insulating base layer 12 and the second insulating base layer 18 in a direction toward the front side.

As a result, when the gimbal portion 5 is projected in the thickness direction, an end edge 48 of the metal supporting board 11 is disposed on the front side of the end edge 47 of the first insulating base layer 12 and the end edge 45 of the second insulating base layer 18.

That is, the end edge 47 of the first insulating base layer 12 and the end edge 45 of the second insulating base layer 18 are spaced apart from each other in the thickness direction by the thickness of the metal supporting board 11 and located at positions inwardly protruded in the insertion opening 36 from the end edge 48 of the metal supporting board 11.

The longitudinal length of the insertion opening 36 is in a range of, e.g., 250 to 800 µm, and the widthwise length thereof is in a range of, e.g., 300 to 700 µm.

The longitudinal length of the insertion opening 36 exposed from the first insulating base layer 12 and the second insulating base layer 18 is in a range of, e.g., 200 to 500 µm, and the widthwise length thereof is in a range of, e.g., 300 to 700 µm.

Then, the metal supporting board 11 is trimmed so that the suspension board with circuit 1 is obtained.

Then, as shown in FIG. 3, on the top surface side of the suspension board with circuit 1, the slider 39 having the light emitting element 40 mounted on the back surface thereof is mounted on the slider mounting region 9 via the adhesive 42 such that the light emitting element 40 is inserted through the insertion opening 36. Thereafter, the solder balls 41 are formed on the respective top surfaces of the head-side terminals 16 and the respective back surfaces of the element-side terminals 22.

Consequently, the magnetic head terminals 43 are disposed on the rear side of the solder balls 41 provided on the top surfaces of the head-side terminals 16 in facing relation, while the light emitting element terminals 44 are disposed on the rear side of the solder balls 41 provided on the back surfaces of the element-side terminals 22 in facing relation.

Then, the magnetic head terminals 43 are electrically connected to the head-side terminals 16 by melting the solder balls 41 provided on the top surfaces of the head-side terminals 16, while the light emitting terminals 44 are electrically connected to the element-side terminals 22 by melting the solder balls 41 provided on the back surfaces of the element-side terminals 22.

In this manner, the slider 39 and the light emitting element 40 are mounted on the suspension board with circuit 1.

In the suspension board with circuit 1 produced by the producing method of the suspension board with circuit 1, as shown in FIG. 3, the end edge 45 of the second insulating base layer 18 is located at a position inwardly protruded in the insertion opening 36 from the end edge 48 of the metal supporting board 11 when projected in the thickness direction.

That is, the end edge 48 of the metal supporting board 11 is relatively receded toward the front side from the end edge 45 of the second insulating base layer 18.

Therefore, when the element-side terminals 22 facing the insertion opening 36 and the light emitting element 40 of the light emitting unit are connected using the solder balls 41, even if a molten solder passes through the gap between the light emitting element 40 and the second insulating base layer 18 and flows toward the metal supporting board 11 to go passed the second insulating base layer 18, it is possible to prevent the solder from coming in contact with the metal supporting board 11.

The first insulating base layer 12 protrudes into the insertion opening 36 to be spaced apart from the second insulating base layer 18 in the thickness direction (top-back direction) by the thickness of the metal supporting board 11.

Therefore, it is also possible to prevent the molten solder from going passed the first insulating base layer 12 and coming in contact with the head-side terminals 16.

This can prevent the head-side terminals 16, the metal supporting board 11, and the element-side terminals 22 from being short-circuited to each other.

Second Embodiment

FIG. 5 shows a second embodiment of the suspension board with circuit of the present invention, which is a cross-sectional view of the slider mounting region.

In the first embodiment described above, the rear end portion of the second insulating base layer 18 is disposed so as to overlap the rear end portion of the first insulating base layer 12 when projected in the thickness direction, and the element-side terminals 22 are provided on the back surface of the second insulating base layer 18. By contrast, in the second embodiment, as shown in FIG. 5, the rear end portion of the second insulating base layer 18 is disposed so as to cover the insertion opening 36 of the metal supporting board 11 with the second insulating base layer 18 when projected in the thickness direction, and the element-side terminals 22 are formed as so-called flying leads so as to extend through the second insulating baser layer 18 in the thickness direction.

In the second embodiment, the top surfaces of the element-side terminals 22 and the second insulating base layer 18 are exposed through the insertion opening 36 when viewed from the top surface side of the suspension board with circuit 1.

On the top surface side of the suspension board with circuit 1, the slider 39 having the light emitting element 40 mounted on the back surface thereof is mounted on the slider mounting region 9 via the adhesive 42 such that the light emitting element 40 is inserted through the insertion opening 36. Thereafter, the solder balls 41 are formed on the respective top surfaces of the head-side terminals 16 and the element-side terminals 22.

As a result, the magnetic head terminals 43 are disposed on the rear side of the solder balls 41 provided on the top surfaces of the head-side terminals 16 in facing relation, while the light emitting element terminals 44 are brought into contact with the top surface of the second insulating base layer 18 so as to be disposed on the rear side of the solder balls 41 provided on the top surfaces of the element-side terminals 22 in facing relation.

Then, the magnetic head terminals 43 are electrically connected to the head-side terminals 16 by melting the solder balls 41 provided on the top surfaces of the head-side terminals 16, while the light emitting element terminals 44 are electrically connected to the element-side terminals 22 by melting the solder balls 41 provided on the top surfaces of the element-side terminals 22.

According to the second embodiment, the metal supporting board 11 and the element-side terminals 22 are disposed to be spaced apart from each other in the front-rear direction via the second insulating base layer 18.

As a result, when the element-side terminals 22 facing the insertion opening 36 and the light emitting element 40 are connected using the solder balls 41, even if a molten solder flows toward the metal supporting board 11, it is possible to prevent the solder from coming in contact with the metal supporting board 11 via the second insulating base layer 18.

Third Embodiment

Figure 6:
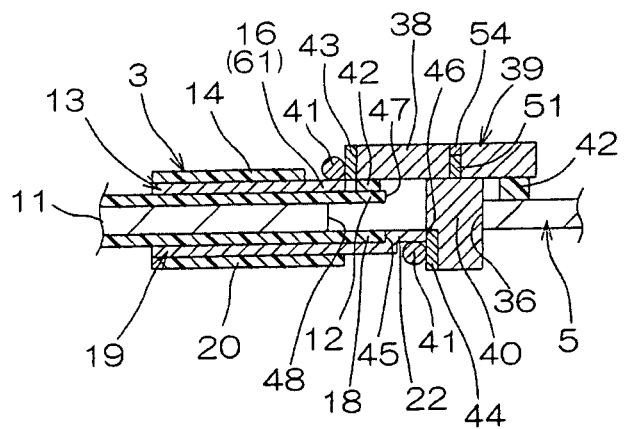
FIG. 6 shows a third embodiment of the suspension board with circuit of the present invention, which is a cross-sectional view of the slider mounting region.

FIG. 6 shows a third embodiment of the suspension board with circuit of the present invention, which is a cross-sectional view of the slider mounting region.

In the first embodiment described above, the element-side terminals 22 are provided on the back surface of the second insulating base layer 18 such that the end edge 46 thereof is generally flush with the end edge 45 of the second insulating base layer 18. By contrast, in the third embodiment, as shown in FIG. 6, the element-side terminals 22 are formed as so-called flying leads so as to protrude rearwardly of the rear end edge of the second insulating base layer 18.

In the third embodiment, each of the element-side terminals 22 protrudes to a middle point in the insertion opening 36 of the metal supporting board 11 when projected in the thickness direction.

In addition, the insertion opening 36 exposed from the second insulating base layer 18 and the element-side terminals 22 when projected in the thickness direction is formed to be capable of receiving the light emitting element 40 (described later).

Then, on the top surface side of the suspension board with circuit 1, the slider 39 having the light emitting element 40 mounted on the back surface thereof is mounted on the slider mounting region 9 via the adhesive 42 such that the light emitting element 40 is inserted through the insertion opening 36. Thereafter, the solder balls 41 are formed on the respective top surfaces of the head-side terminals 16 and the element-side terminals 22.

As a result, the magnetic head terminals 43 are disposed on the rear side of the solder balls 41 provided on the top surfaces of the head-side terminals 16 in facing relation, while the light emitting element terminals 44 are disposed on the rear side of the solder balls 41 provided on the back surfaces of the element-side terminals 22.

Then, the magnetic head terminals 43 are electrically connected to the head-side terminals 16 by melting the solder balls 41 provided on the top surfaces of the head-side terminals 16, while the light emitting element terminals 44 are electrically connected to the element-side terminals 22 by melting the solder balls 41 provided on the back surfaces of the element-side terminals 22.

In the third embodiment also, the same function and effect as obtained in the first embodiment described above can be obtained.

Fourth Embodiment

Figure 7:
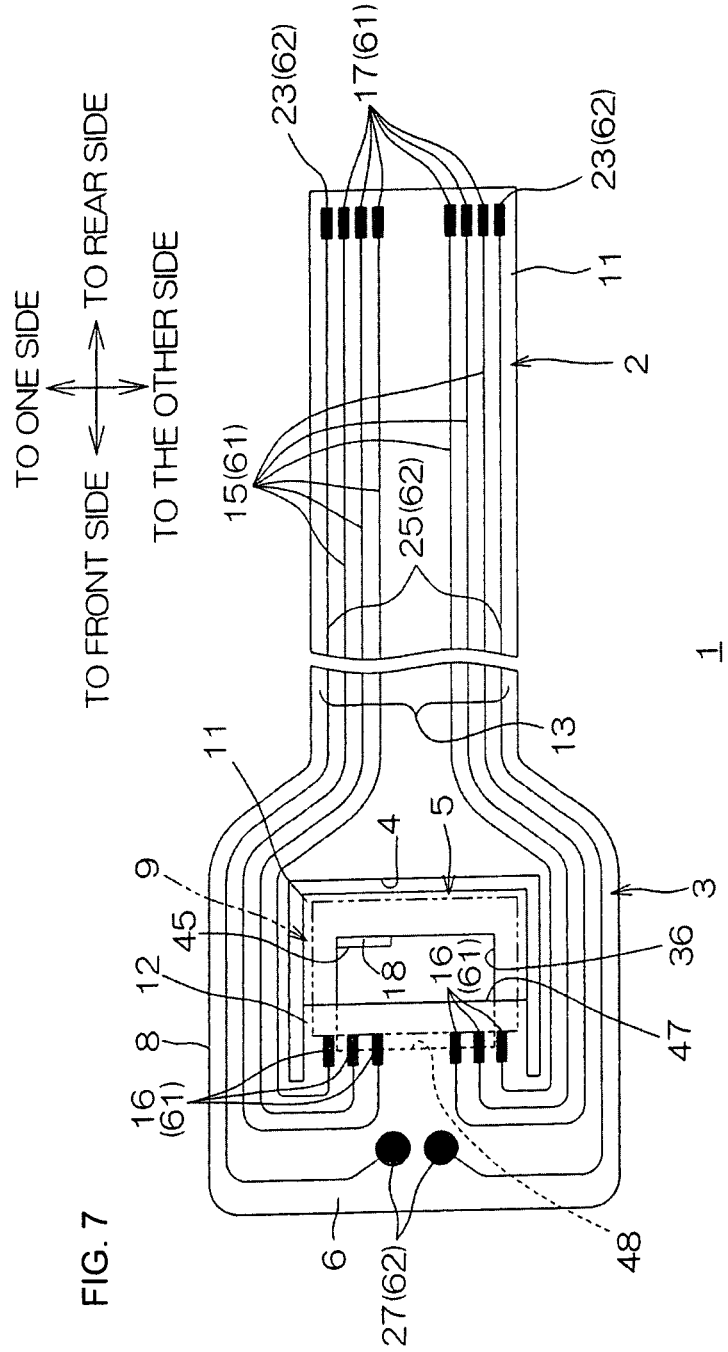
FIG. 7 is a plan view of a fourth embodiment of the suspension board with circuit of the present invention.
Figure 8:
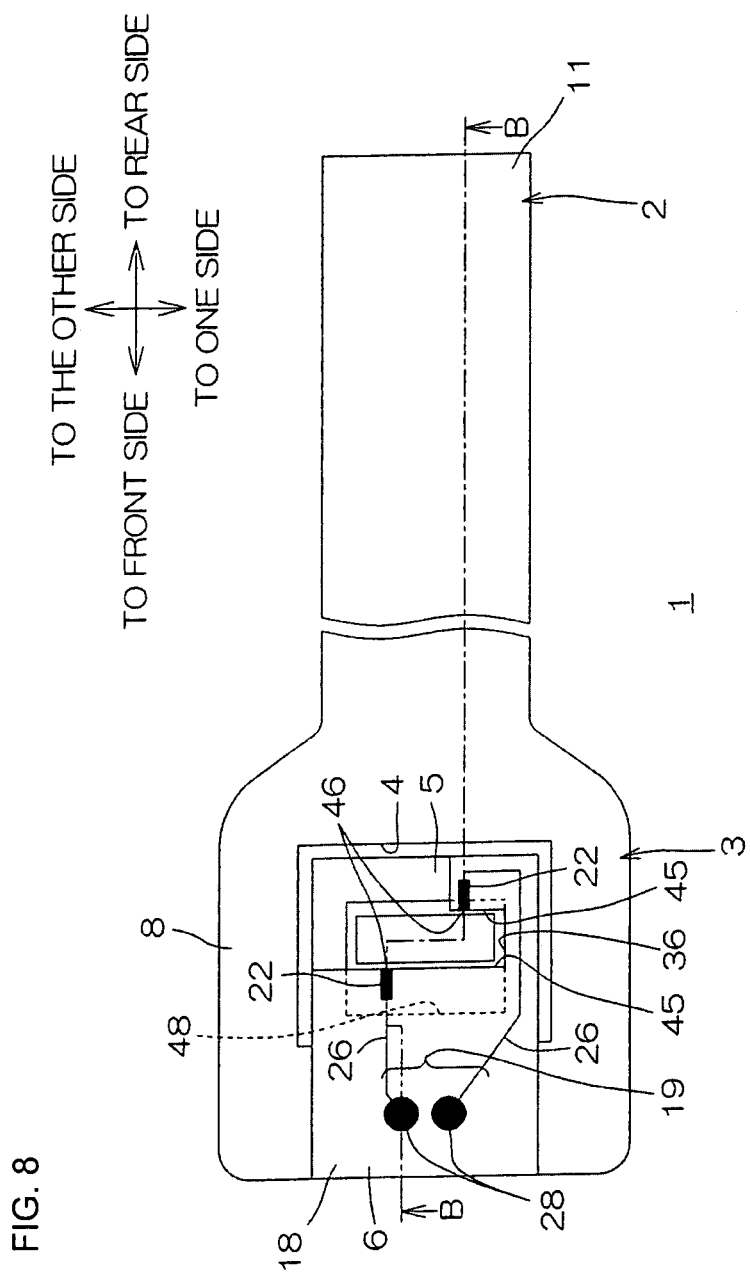
FIG. 8 is a bottom view of the suspension board with circuit shown in FIG. 7.
Figure 9:
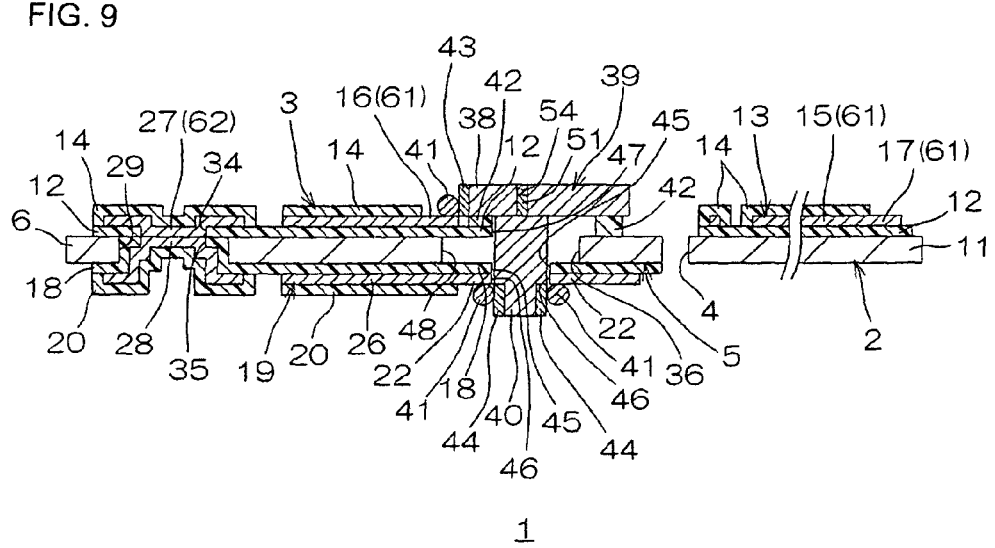
FIG. 9 is a cross-sectional view of the suspension board with circuit shown in FIG. 8 along the line B-B.

FIG. 7 is a plan view of a fourth embodiment of the suspension board with circuit of the present invention. FIG. 8 is a bottom view of the suspension board with circuit shown in FIG. 7. FIG. 9 is a cross-sectional view of the suspension board with circuit shown in FIG. 8 along the line B-B.

Figure 10:
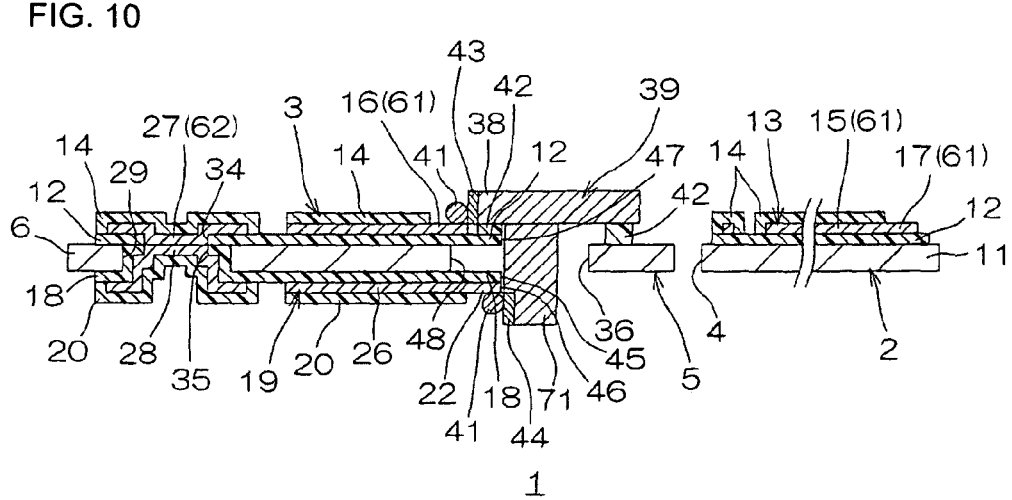
FIG. 10 is a cross-sectional view showing a variation of the suspension board with circuit of the present invention.
Figure 11:
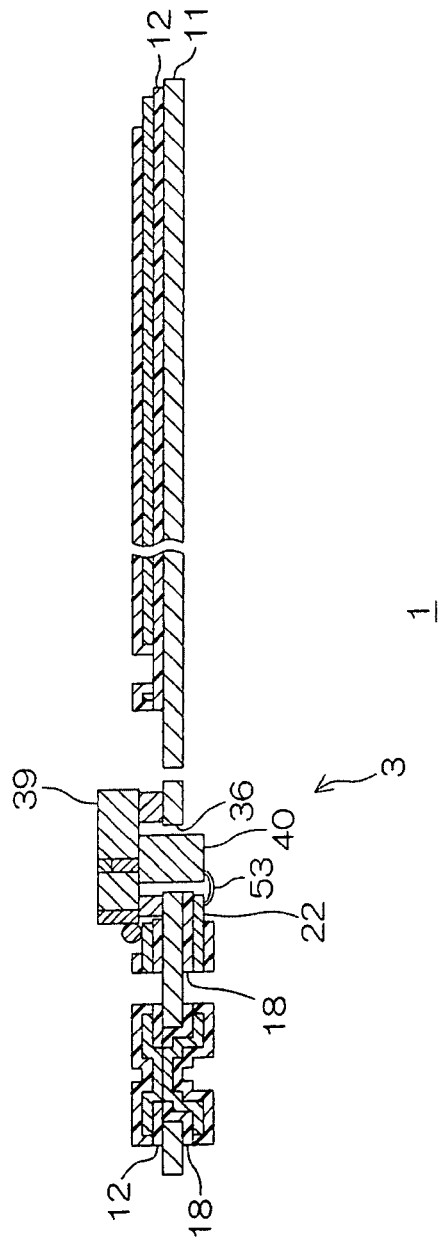
FIG. 11 is a cross-sectional view of a conventional suspension board with circuit.
Figure 12:
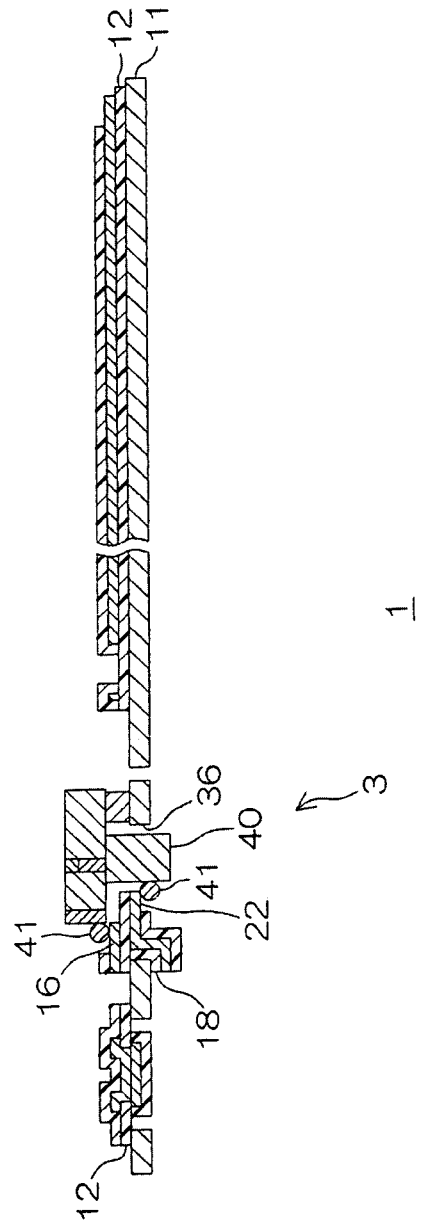
FIG. 12 is a cross-sectional view of the conventional suspension board with circuit.

In each of the embodiments described above, the pair of (two) element-side terminals 22 are disposed on one side (front side) of the insertion opening 36. However, as shown in FIGS. 8 to 10, it is also possible to, e.g., dispose the pair of element-side terminals 22 on both front side and rear side of the insertion opening 36.

That is, the pair of element-side terminals 22 are disposed such that the insertion opening 36 is interposed therebetween.

More specifically, as shown in FIG. 8, the plurality of (two) element-side terminals 22 are paired up and respectively formed on the front side and rear side of the insertion opening 36.

The element-side terminal 22 on one widthwise side is disposed on the rear side of the insertion opening 36, while the element-side terminal 22 on the other widthwise side is disposed on the front side of the insertion opening 36.

The back-side power source wire 26 electrically connected to the element-side terminal 22 on one widthwise side is formed to extend obliquely rearward from the conducting portion 15 in one widthwise direction, then extend rearward at the gimbal portion 5 on one widthwise side of the insertion opening 36, subsequently be turned back toward the front side at the gimbal portion 5 on the rear side of the insertion opening 36, and finally reach the element-side terminal 22 on one widthwise side.

On the back surface of the metal supporting board 11, the second insulating base layer 18 is formed so as to correspond to the second conductive pattern 19.

Specifically, the second insulating base layer 18 is formed at the widthwise generally middle (gimbal portion 5) of the mounting portion 3 such that the rear end edge thereof overlaps the end edge 47 (rear end edge) of the first insulating base layer 12 when projected in the thickness direction. Also, the second insulating base layer 18 is formed at the gimbal portion 5 on one widthwise side of the insertion opening 36 and at one widthwise end portion of the gimbal portion 5 on the rear side of the insertion opening 36 so as to protrude rearward from one widthwise end portion of the rear end edge thereof.

Also, the end edge 45 (front end edge) of the second insulating base layer 18 formed at one widthwise end portion of the gimbal portion 5 on the rear side of the insertion opening 36 is located at a position forwardly protruded from the rear end edge of the insertion opening 36 when projected in the thickness direction.

Note that, to locate the end edge 45 (front end edge) of the second insulating base layer 18 formed at one widthwise end portion of the gimbal portion 5 on the rear side of the insertion opening 36 at the position forwardly protruded from the rear end edge of the insertion opening 36, when the insertion opening 36 is formed, an etching time is set relatively long to rearwardly over-etch the metal supporting board 11 at the rear end edge of the insertion opening 36.

In the back-surface-side end portion of the light emitting element 40, the light emitting element terminals 44 are provided on the front end side and on the rear end side so as to correspond to the element-side terminals 22 of the suspension board with circuit 1 in one-to-one correspondence.

The back-surface-side end portion of the light emitting element 40 passes through the insertion opening 36 such that the front-side end edge thereof is disposed on the rear side of the end edge 45 (rear end edge) of the second insulating base layer 18 on the front side of the insertion opening 36 and the end edge 46 (rear end edges) of the element-side terminal 22 on the other widthwise side to be proximate thereto and slightly spaced apart therefrom.

The rear end edge of the light emitting element 40 is disposed on the front side of the end edge 45 (front-side end edge) of the second insulating base layer 18 on the rear side of the insertion opening 36 and the end edge 46 (front-side end edge) of the element-side terminal 22 on one widthwise side to be proximate thereto and slightly spaced apart therefrom.

Then, on the top surfaces of the head-side terminals 16 and the back surfaces of the both element-side terminals 22, the respective solder balls 41 are formed.

As a result, the magnetic head terminals 43 are disposed on the rear side of the solder balls 41 provided on the top surfaces of the head-side terminals 16 in facing relation, while the both light emitting element terminals 44 are disposed on the solder balls 41 provided on the back surfaces of the element-side terminals 22 in facing relation.

Then, the magnetic head terminals 43 are electrically connected to the head-side terminals 16 by melting the solder balls 41 provided on the top surfaces of the head-side terminals 16, while the light emitting element terminals 44 are electrically connected to the element-side terminals 22 by melting the solder balls 41 provided on the back surfaces of the element-side terminals 22.

In the suspension board with circuit 1 described above, the element-side terminals 22 electrically connected to the light emitting element 40 are disposed such that the insertion opening 36 is interposed therebetween. Accordingly, the light emitting element 40 can be connected in two directions to the second conductive pattern 19.

Therefore, the element-side terminals 22 connecting the light emitting element 40 and the second conductive pattern 19 can be disposed in scattered relation, and the wiring density can be reduced compared with that in the case where the light emitting element 40 is connected in one direction to the second conductive pattern 19. As a result, it is possible to suppress a short circuit and improve connection reliability.

Other Embodiments

Note that, in each of the foregoing embodiments, the light emitting element 40 is mounted as the electronic element in the present invention. However, as shown in FIG. 10, it is also possible to, e.g., mount a testing element 71 as the electronic element.

The testing element 71 is not particularly limited. Examples of the testing element 71 include an element which produces an electric signal in response to vibration or pressure.

When the suspension board with circuit 1 is used in a hard disk drive, if there is roughness or disorder present in the surface of a magnetic disk, the slider 39 floating over and traveling relative to the magnetic disk, while holding a minute gap therebetween, vibrates or receives pressure.

In the suspension board with circuit 1 on which the testing element 71 is mounted, the testing element 71 senses vibration, pressure, or the like in the slider 39 and produces an electric signal.

Therefore, by detecting the electric signal produced by the testing element 71, it is possible to sense the roughness or disorder in the magnetic disk and examine whether or not the magnetic disk is defective.

While the illustrative embodiments of the present invention are provided in the above description, such is for illustrative purpose only and it is not to be construed limitative. Modification and variation of the present invention which will be obvious to those skilled in the art is to be covered by the following claims.

What is claimed is:

1. A suspension board with circuit for mounting thereon a slider on which a magnetic head is mounted and an electronic element provided in a vicinity of the magnetic head, comprising:

a metal supporting board;

a first insulating layer laminated on a top surface of the metal supporting board;

a second insulating layer laminated on a back surface of the metal supporting board;

a first conductive pattern laminated on the top surface side of the first insulating layer and including a first terminal electrically connected to the magnetic head; and a second conductive pattern laminated on the back surface side of the second insulating layer and including a second terminal electrically connected to the electronic element, wherein a slider mounting region for mounting thereon a slider, wherein in the slider mounting region, the slider is mounted on the top surface side, in the slider mounting portion, an electronic element mounting space in which the electronic element is disposed is formed so as to extend through the metal supporting board in a top-back direction extending between the top and back surfaces thereof, when projected in the top-back direction, respective end edges of the first insulating layer and the second insulating layer are spaced apart from each other in a thickness direction by a thickness of the metal supporting board and located at positions inwardly protruded in the electronic element mounting space from an end edge of the metal supporting board, and the second terminal is disposed so as to face the electronic element mounting space.

2. A method of producing a suspension board with circuit for mounting thereon a slider on which a magnetic head is mounted and an electronic element provided in a vicinity of the magnetic head, the method comprising:

preparing a metal supporting board;

forming a first insulating layer on a top surface of the metal supporting board;

forming a first conductive pattern including a first terminal electrically connected to the magnetic head, on the top surface side of the first insulating layer;

forming a second insulating layer on a back surface of the metal supporting board;

forming a second conductive pattern including a second terminal electrically connected to the electronic element, on the back surface side of the second insulating layer; and etching the metal supporting board to form an electronic element mounting space in which the electronic element is disposed such that the electronic element mounting space extends through the metal supporting board in a top-back direction extending between the top surface side and the back surface side thereof and, when projected in the top-back direction, respective end edges of the first insulating layer and the second insulating layer are spaced apart from each other in a thickness direction by a thickness of the metal supporting board and located at positions inwardly protruded in the electronic element mounting space from an end edge of the metal supporting board, while the second terminal faces the electronic element mounting space.

* * * * *